(12) United States Patent
Kim et al.

(10) Patent No.: US 7,720,473 B2
(45) Date of Patent: May 18, 2010

(54) SYSTEM AND METHOD FOR OPTIMIZING HANDOVER IN MOBILE COMMUNICATION SYSTEM

(75) Inventors: Jung-Won Kim, Seoul (KR); Bo-Kyung Wang, Seongnam-si (KR); Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 716 days.

(21) Appl. No.: 11/146,683

(22) Filed: Jun. 7, 2005

(65) Prior Publication Data

US 2005/0282548 A1    Dec. 22, 2005

(30) Foreign Application Priority Data

Jun. 7, 2004    (KR)    .................. 10-2004-0041540

(51) Int. Cl.
*H04W 4/00*    (2009.01)
(52) U.S. Cl. .................... 455/432.1; 455/436
(58) Field of Classification Search ............. 455/428, 455/432.1, 435.1, 453.2, 436, 442, 439
See application file for complete search history.

(56) References Cited

U.S. PATENT DOCUMENTS

| | | | |
|---|---|---|---|
| 6,356,755 B1 * | 3/2002 | Valentine et al. | 455/435.1 |
| 6,587,680 B1 * | 7/2003 | Ala-Laurila et al. | 455/411 |
| 6,721,555 B1 * | 4/2004 | Phillips et al. | 455/411 |
| 6,725,038 B1 * | 4/2004 | Subbiah | 455/436 |
| 6,876,640 B1 * | 4/2005 | Bertrand et al. | 370/331 |
| 6,876,747 B1 * | 4/2005 | Faccin et al. | 380/247 |
| 6,947,399 B1 * | 9/2005 | Sen et al. | 370/331 |
| 6,968,190 B1 * | 11/2005 | Suumaki et al. | 455/436 |
| 7,103,662 B2 * | 9/2006 | Ray et al. | 709/225 |

(Continued)

FOREIGN PATENT DOCUMENTS

JP    2003-515995    5/2003

(Continued)

OTHER PUBLICATIONS

Phillip Barber, Revision of Hand-over Mechanism for Mobility Enhancement, IEEE 802.16 Broadband Wireless Access Working Group, Jan. 2, 2004.

(Continued)

*Primary Examiner*—Charles N Appiah
*Assistant Examiner*—Kwasi Karikari
(74) *Attorney, Agent, or Firm*—The Farrell Law Firm, LLP

(57) ABSTRACT

Disclosed are a system and a method for optimizing a handover process in a mobile broadband wireless access system. The method performs handover in a mobile communication system including a mobile subscriber station, a serving base station currently providing service to the mobile subscriber station, and at least one neighbor base stations adjacent to the serving base station. The method includes the steps of receiving a handover request from the mobile subscriber station by the serving base station; instructing the mobile subscriber station to perform handover by the serving base station in response to the handover request from the mobile subscriber station and performing by the mobile subscriber station a network reentry process for fast handover in accordance with information included in a handover instruction from the serving base station.

8 Claims, 7 Drawing Sheets

U.S. PATENT DOCUMENTS

| | | |
|---|---|---|
| 2003/0086394 A1 | 5/2003 | Zeira et al. |
| 2004/0203783 A1* | 10/2004 | Wu et al. ............... 455/436 |
| 2004/0228304 A1* | 11/2004 | Riedel et al. ............ 370/332 |
| 2005/0202828 A1* | 9/2005 | Pecen et al. ............. 455/453 |

FOREIGN PATENT DOCUMENTS

| | | |
|---|---|---|
| KR | 1020020000341 | 1/2002 |
| KR | 2003-0043402 | 6/2003 |
| RU | 2 188 518 | 8/1999 |
| WO | WO 97/31487 | 8/1997 |
| WO | WO 01/39525 | 5/2001 |

OTHER PUBLICATIONS

Yong Chang, Changes on 802.16e to Support the Flexible Management of Session Information, IEEE 802.16 Broadband Wireless Access Working Group, Mar. 11, 2004.

* cited by examiner

SYSTEM AND METHOD FOR OPTIMIZING HANDOVER IN MOBILE COMMUNICATION SYSTEM

PRIORITY

This application claims priority to an application entitled "System And Method For Optimizing Handover In Mobile Communication System" filed in the Korean Intellectual Property Office on Jun. 7, 2004 and assigned Ser. No. 2004-41540, the contents of which are hereby incorporated by reference.

BACKGROUND OF THE INVENTION

1. Field of the Invention

The present invention relates to a system and a method for handover in a mobile communication system, and more particularly to a system and a method for optimizing a handover process, which can reduce handover time delay in a broadband mobile system.

2. Description of the Related Art

In a $4^{th}$ generation (hereinafter, referred to as a 4G) communication system, which is the next generation communication system, research has been actively pursued to provide users with services having various quality of services (hereinafter, referred to as a QoSs) and supporting a transmission speed of about 100 Mbps. Especially, in a current 4G communication system, research has been actively pursued to develop a new type of communication system ensuring mobility and QoS in the wireless Local Area Network (LAN) system and the wireless Metropolitan Area Network (MAN) system supporting relatively high transmission speeds, and support a high speed service to be provided by the 4G communication system. As representatives of such new type communication systems, an Institute of Electrical and Electronics Engineers (IEEE) 802.16a communication system and an IEEE 802.16e communication system have been developed.

The IEEE 802.16a communication system and an IEEE 802.16e communication system employ an Orthogonal Frequency Division Multiplexing (OFDM) scheme and an Orthogonal Frequency Division Multiple Access (OFDMA) scheme in order to support broadband transmission network for a physical channel of the wireless MAN system.

The IEEE 802.16a communication system is a system for only a single structure without reflecting the mobility of a Subscriber Station (SS) at all, in which the SS is in a stationary state. In contrast, the IEEE 802.16e communication system is a system reflecting the mobility of SS, and the SS having the mobility will be referred to as a Mobile Subscriber Station (MSS).

Hereinafter, the structure of the conventional IEEE 802.16e communication system will be described with reference to FIG. 1 which is a block diagram schematically illustrating a structure of a conventional mobile communication system (e.g. the IEEE 802.16e communication system).

The IEEE 802.16e communication system has a multi-cell structure including a cell 100 and a cell 150. Further, the IEEE 802.16e communication system includes a Base Station (BS) 110 controlling the cell 100, a BS 140 controlling the cell 150, and a plurality of MSSs 111, 113, 130, 151 and 153. The transmission/reception of signals between the BS 110 and 140 and the MSSs 111, 113, 130, 151 and 153 is accomplished using an OFDM/OFDMA method. Herein, the MSS 130 is located in an overlapping area (i.e., a handover area) between the cell 100 and the cell 150. Accordingly, when the MSS 130 moves further into the cell 150 controlled by the BS 140 while transmitting/receiving a signal with the BS 110, a serving BS for the MSS 130 changes from the BS 110 to the BS 140.

Hereinafter, a typical process of handover will be discussed with reference to FIG. 2 which is a flow diagram illustrating a typical handover process.

First, an MSS 210 linked to a serving BS (BS #1) 220 tries to connect to a new BS when a status of the link to the serving BS 220 degrades below a predetermined threshold. In order to determine suitable base stations which can serve as a new serving base station, the MSS 210 scans linkable neighbor BSs, for example, BS #2 230, BS #3 240 and BS #4 250 (Step 201). Thereafter, based on the determination, the MSS 210 selects BSs (e.g., BS #2 230, BS #3 240) to which the MSS 210 will request handover. Then, the MSS 210 transmits to the serving BS 220 an MSS handover request (MOB_MSSHO_REQ) message including the recommended neighbor BSs 230 and 240 and the scanned result (Step 203). Upon receiving the MOB_MSSHO_REQ message, the serving BS 220 transmits a handover pre-notification (HO_pre_notification) message reporting the handover request by the MSS 210 to the recommended neighbor BSs (i.e., BS #2 230 and BS #3 240) contained in the MOB_MSSHO_REQ message (Steps 205 and 207, respectively). The HO_pre_notification message includes a required bandwidth and required service quality information of the MSS 210. Upon receiving the HO_pre_notification message, the neighbor BSs 230 and 240 transmit to the serving BS 220 a response (HO_pre_notification_response) message including approval or disapproval of the handover request of the MSS 210 which is based on their own resource statuses (Steps 209 and 211, respectively). Thereafter, the serving BS 220 determines BSs to which the MSS 210 can be handovered and transmits a handover response (MOB_BSHO_RSP) message including the determined BSs to the MSS 210 (Step 215). Here, the MOB_BSHO_RSP message includes one or more BSs. Thereafter, the serving BS 220 transmits a handover confirmation (HO_confirm) message to the target BS one of the recommended target BSs (e.g. BS #3 240) included in the MOB_BSHO_RSP message so that the BS can prepare the handover of the MSS 210 (Step 213).

Upon receiving the MOB_BSHO_RSP message, the MSS 210 determines a target BS to which handover will be performed from among the recommended target BSs included in the MSS_BSHO_RSP message and transmits to the serving BS 220 a handover indication (MOB_HO_IND) message including the determined BS (Step 217). Upon receiving the MOB_HO_IND message from the MSS 210, the serving BS 220 releases the wireless connection channel with the MSS 210 (Step 219).

Then, the MSS 210 performs a network reentry process with the neighbor BS (e.g. BS #3 240) included in the MOB_HO_IND message (Steps 221-225). Hereinafter, the neighbor BS to which the MSS 210 moves and newly connects will be referred to as a target BS. After performing the network reentry process, the MSS 210 sets a new wireless connection channel with the target BS 240. The network reentry process with the target BS 240 is similar to the network entry process with the serving BS 220 and includes the steps of: (1) downlink/uplink parameter acquisition; (2) ranging; (3) basic capability re-negotiation; (4) re-authorization; (5) re-register; and (6) re-establishment of IP connectivity. Finally, the MSS 210 having established a new wireless connection channel with the target BS 240 can continue the data transmission (Step 227). According to the construction as described above, in the course of releasing the wireless connection channel with the existing serving BS and establishing a new wireless connection channel with the target BS, the existing serving BS deletes the service context of the MSS at the following time point. That is to say, the serving BS deletes the service context at the time point when receiving the MOB_HO_IND message from the MSS or at the time point when receiving a handover completion message from the target BS after establishment of a new wireless connection channel between the MSS and the target BS is completed. Here, the handover completion message has yet to be defined in detail.

The existing handover method in which the MSS releases the existing wireless connection channel with the serving BS and establishes a new wireless connection channel with the target BS at the time of handover as described above has the following disadvantages.

Specifically, according to the existing handover method, frequent handover is necessary when an MSS frequently moves between different cells controlled by different BSs and a network reentry process causing a delay is necessary whenever the handover is performed. Therefore, according to the existing handover method, interruption of data transmission/reception due to handover may increase and become unacceptable.

Further, if the handover process is initiated when the signal from the serving BS has a Carrier to Interference and Noise Ratio (CINR) is smaller than that of a neighbor BS, the MOB_MSSHO_REQ message, the MOB_BSHO_RSP message and MOB_HO_IND message must be transmitted even in a state in which the connection between the MSS and the serving BS is poor. In this case, a transmission error or a delay due to a retransmission may occur which can cause further delays and service interruptions. Moreover, a random access delay may occur when the MSS transmits the MOB_MSSHO_REQ message and the MOB_HO_IND message. Therefore, depending on the length of the time delay, the connection with the serving BS may be interrupted even before the handover process is completed.

SUMMARY OF THE INVENTION

Accordingly, the present invention has been made to solve the above-mentioned problems occurring in the prior art, and it is an object of the present invention to provide a system and a method for optimizing a handover process in a mobile broadband wireless access system.

It is another object of the present invention to provide a backbone communication method and polling method for optimizing a handover process in a mobile broadband wireless access system.

It is a further another object of the present invention to provide a system and a method for optimizing a handover process, which can reduce a network reentry process at every handover in a mobile broadband wireless access system.

It is a still another object of the present invention to provide a system and a method for optimizing a handover process, which can reduce handover time delay by using a polling mechanism in a mobile broadband wireless access system.

In order to accomplish the aforementioned objects, there is provided a method for performing a handover in a mobile communication system including a mobile subscriber station, having a serving base station currently providing service to the mobile subscriber station, and having at least one neighbor base stations adjacent to the serving base station. The method including the steps of: receiving by the serving base station a handover request from the mobile subscriber station; instructing by the serving base station the mobile subscriber station to perform a handover in response to the handover request from the mobile subscriber station; and performing by the mobile subscriber station a network reentry process for fast handover in accordance with information included in a handover instruction from the serving base station.

In accordance with another aspect of the present invention, there is provided a method for performing a handover by a mobile subscriber station in a mobile communication system including the mobile subscriber station, having a serving base station currently providing service to the mobile subscriber station, and having a plurality of neighbor base stations adjacent to the serving base station. The method including the steps of: transmitting from the mobile subscriber station to the serving base station a handover request; receiving from the serving base station by the mobile subscriber station response message in response to the handover request; confirming communication level information for handover included in the response message from the serving base station; and performing by the mobile subscriber station and the target base station a network reentry process for fast handover while omitting at least one step of the network reentry process in accordance with the communication level information.

In accordance with another aspect of the present invention, there is provided a method for supporting handover by a serving base station in a mobile communication system including a mobile subscriber station, the serving base station currently providing service to the mobile subscriber station, and a target base station adjacent to the serving base station. The method including the steps of: transmitting a function profile of the mobile subscriber station upon receiving a handover request from the mobile subscriber station; and transmitting a response message to the mobile subscriber station, the response message having information omitted for performing a fast reentry process with the target base station.

In accordance with another aspect of the present invention, there is provided a method for performing a handover by a target base station in a mobile communication system including a mobile subscriber station, having a serving base station currently providing service to the mobile subscriber station, and having the target base station adjacent to the serving base station. The method including the steps of: transmitting to the serving base station response information and communication level information when it is determined during a process of negotiation through a network backbone message with the serving base station that the target base station can provide service to the mobile subscriber station, the communication level information including a communication level at which the target base station and the mobile subscriber station will perform communication; receiving a function profile of the mobile subscriber station from the serving base station; and performing a fast handover together with the mobile subscriber station through a network reentry process omitting at least one predetermined step.

In accordance with another aspect of the present invention, there is provided a method for optimizing a handover process in a mobile communication system including a serving base station, a mobile subscriber station, and a target base station. The method including the steps of: dividing the handover process into multiple levels of backbone communication in order to minimize a time delay due to a handover and selecting a corresponding backbone communication level by the target base station in a process of negotiation through a network backbone message between the serving base station and the target base station; transmitting a from the serving base station to the mobile subscriber station handover response message, the handover response message informing the mobile subscriber station of the corresponding backbone communication level selected by the target base station; transmitting to the target base station information of the mobile subscriber station corresponding to the backbone communication level; and performing by the mobile subscriber station a network reentry process omitting a predetermined message transmission/reception process corresponding to the backbone communication level from the serving base station.

In accordance with another aspect of the present invention, there is provided a method for performing a handover in a mobile communication system including a mobile subscriber station, a serving base station currently providing service to the mobile subscriber station, and a plurality of neighbor base stations adjacent to the serving base station. The method including the steps of: transmitting from the serving base station to the mobile subscriber station a handover request message, the handover request message having information omitted for performing fast reentry process together with the target base station; and performing fast handover by the mobile subscriber station through a network reentry process omitting at least one predetermined step based on information included in the handover request message.

In accordance with another aspect of the present invention, there is provided a handover support system for supporting handover in a mobile communication system including a mobile subscriber station, a serving base station currently providing service to the mobile subscriber station, and a plurality of neighbor base stations adjacent to the serving base station. The handover support comprises a serving base station for receiving a message including a selected backbone communication level from an available target base station during a process of network negotiation, transmitting a function profile of the mobile subscriber station to the target base station in response to the message, and transmitting a handover response message including the appointed backbone communication level to the mobile subscriber station, thereby instructing the mobile subscriber station to perform fast handover omitting a predetermined step corresponding to the backbone communication level; a target base station for receiving information of the mobile subscriber station to be handed over from the serving base station and selecting and transmitting a corresponding backbone communication level to the serving base station in response to the received information; and a mobile subscriber station for receiving the handover response message from the serving base station and performing a network reentry process for fast handover together with the target base station in accordance with the backbone communication level included in the handover response message.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may make the subject matter of the present invention unclear.

The present invention proposes a solution for improving a handover process in a Mobile Broadband Wireless Access (MBWA) system. That is, the present invention proposes a solution for optimizing a handover process in order to improve handover performance in a MBWA system. For such optimization, the present invention proposes a stepped backbone communication and polling mechanism and defines a signaling process and message for realizing them.

The backbone communication according to the present invention includes three levels, that is, a first-level (Level 1) backbone communication, a second-level (Level 2) backbone communication and a third-level (Level 3) backbone communication (wherein each level is also known as a step). Hereinafter, a method according to an embodiment of the present invention, for optimizing a network reentry process through the three-stepped backbone as described above, will be discussed. In the following description, it should be noted that target BS 1 and target BS 2 are the neighbor BSs to which the MSS can move, that is, target BSs included in the target BS list.

Figure 1:
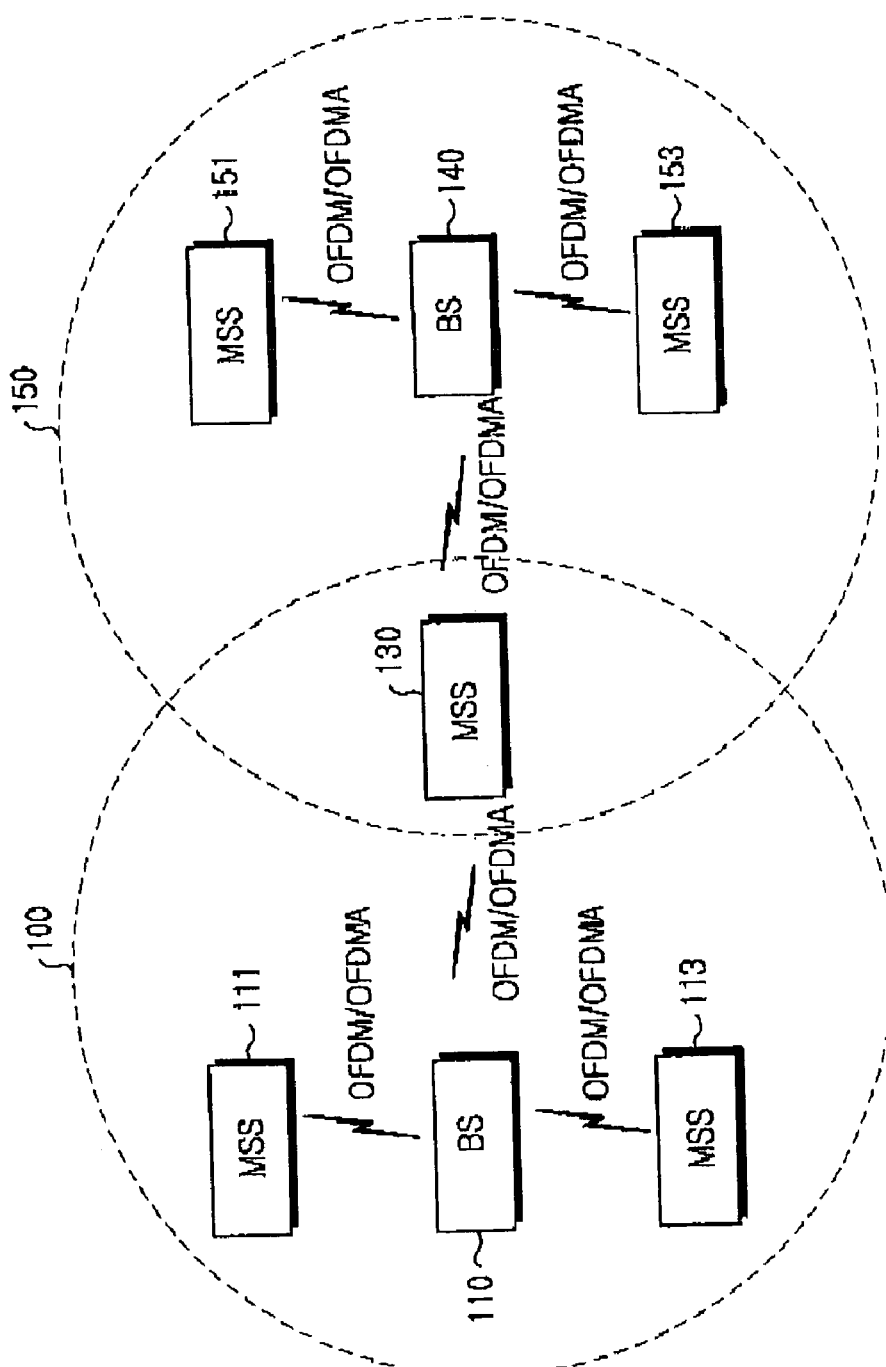
FIG. 1 is a block diagram schematically illustrating a structure of a conventional mobile communication system.
Figure 2:
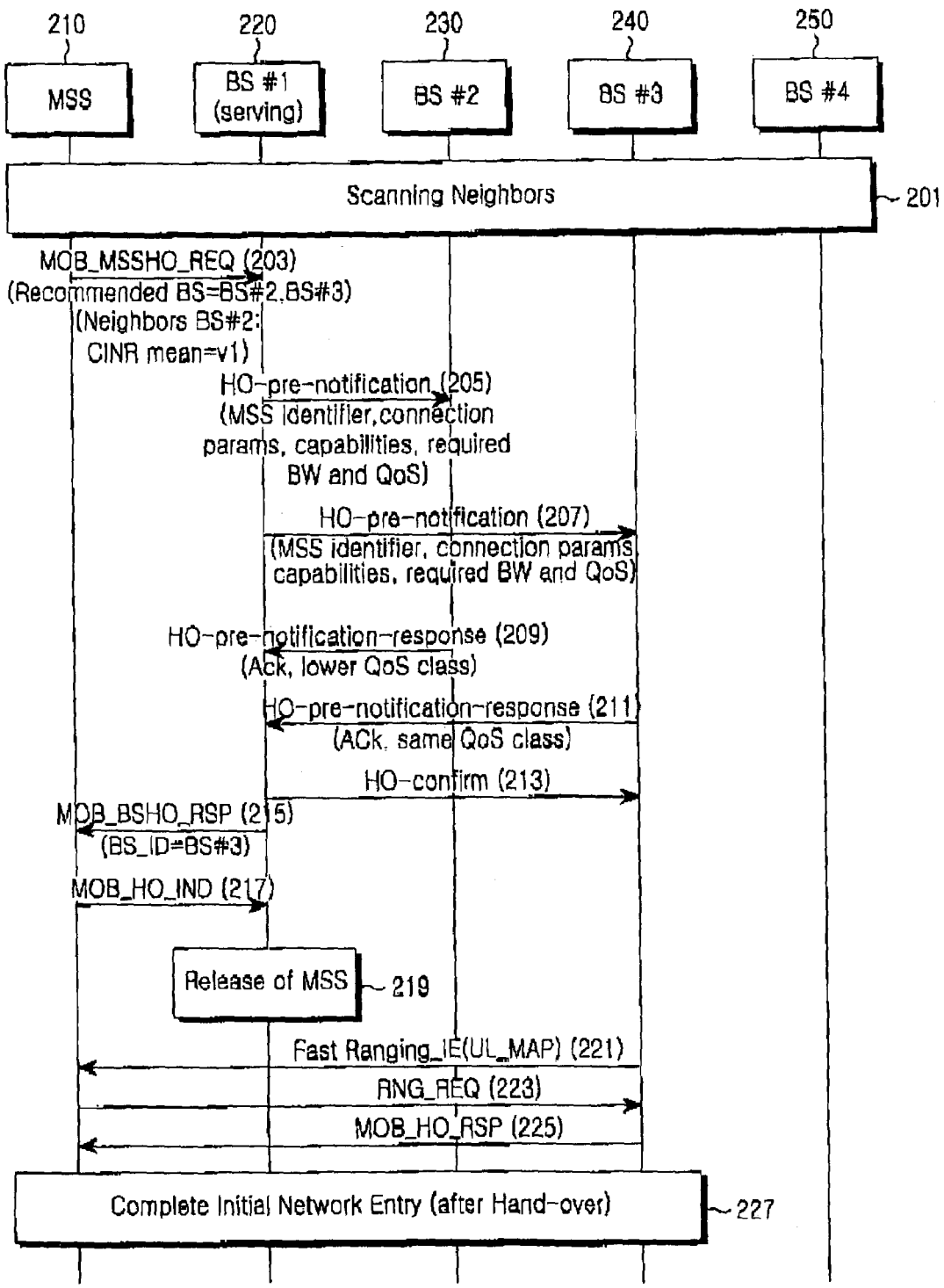
FIG. 2 is a flow chart for illustrating a typical handover process.

In the following description about a handover method according to the present invention, the same operation as that in the conventional handover method as shown in FIG. 2 will not be repeatedly described and only the stepped backbone communication according to the present invention will be mainly discussed in detail.

Figure 3:
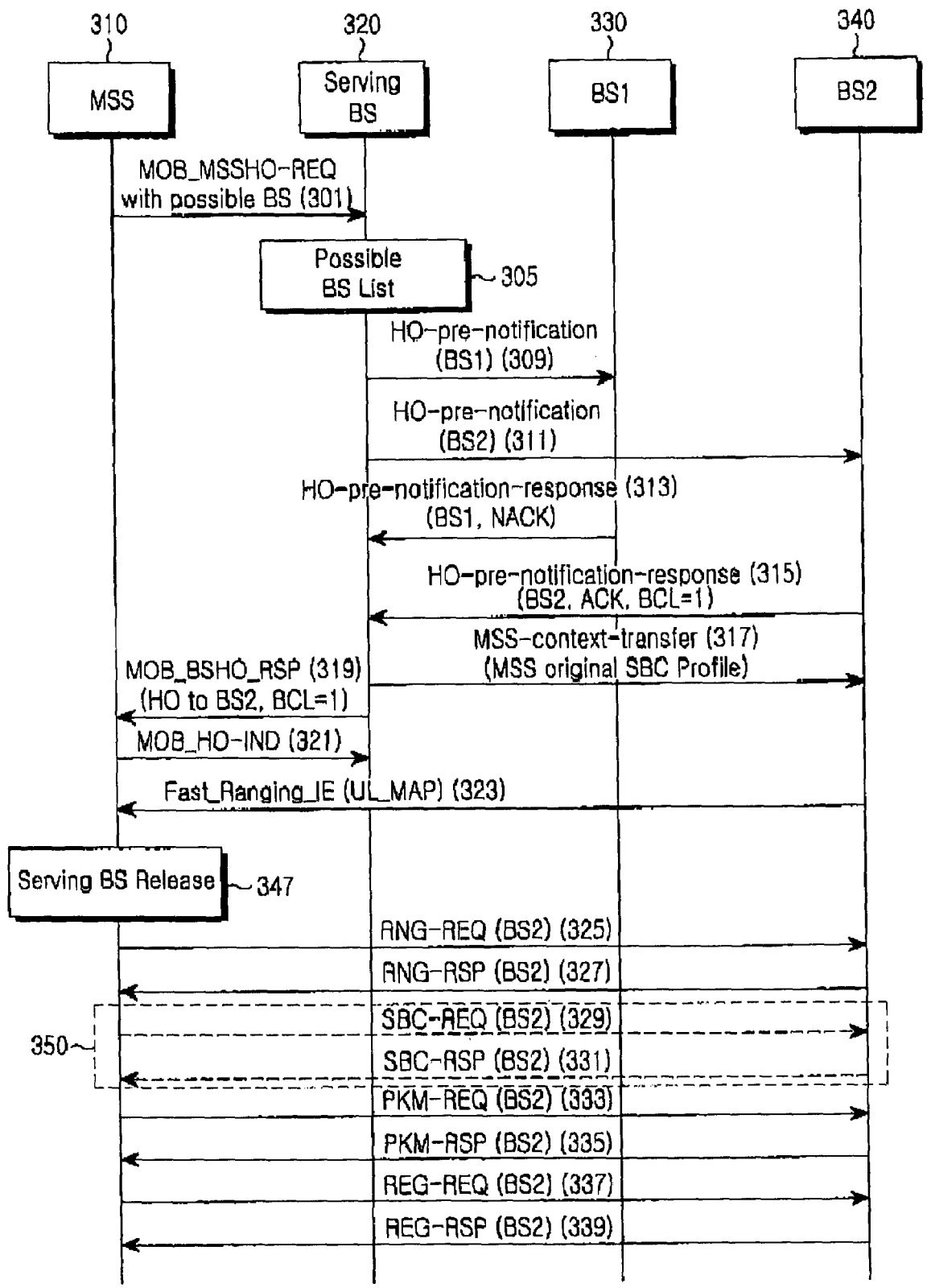
FIG. 3 is a flow diagram of a backbone communication process for handover optimization in a mobile broadband wireless access system according to an embodiment of the present invention.

FIG. 3 is a flow diagram illustrating a first-level backbone communication for handover optimization in a mobile broadband wireless access system according to a preferred embodiment of the present invention.

The first-level backbone communication process is a process in which a serving BS 320 transmits a capability profile of an MSS 310 to target BSs 330 and 340, so that the step of basic capability re-negotiation, that is, the steps of transmitting SBC_REQ and SBC_RSP (as shown in Step 350) can be omitted from the network reentry process.

The flow diagram shown in FIG. 3 illustrates the first-step (-level) from among the three-step backbone communication proposed according to the present invention in order to minimize delay in handover. As shown in FIG. 3, in the first-level, in the course of negotiation through network backbone messages including the HO_pre_notification message (Steps 309 and 311) and the HO_pre_notification_response message (Steps 313 and 315) between the serving BS 320 and available target BSs 330 and 340, the available target BSs insert an acknowledgement (ACK) or not acknowledgement (NACK) in the transmitted HO_pre_notification_response message. The flow diagram illustrated in FIG. 3 is based on an assumption that the target BS2 340 is a serviceable target BS. Here, the serviceable target BS2 340 transmits the HO_pre_notification_response message after inserting a corresponding Backbone Communication Level (BCL, e.g. BCL=1) together with the ACK in the HO_pre_notification_response message (Step 315.

Then, the serving BS 320 inserts the information of BCL (BCL=1) received from the target BS2 340 in the MOB_B-SHO_RSP message and then transmits the message to the MSS 310 (Step 319). Here, the MOB_BSHO_RSP message may include the following numbers for indicating the backbone communication level (BCL): 0=Semi Nomadic; 1=backbone communication level 1 (Omit SBC-REQ/RSP during reentry processing); 2=backbone communication level 2 (Omit SBC-REQ/RSP, PKM-REQ/RSP and REG-REQ/RSP during reentry processing); and 3=backbone communication level 3 (Omit SBC-REQ/RSP, PKM-REQ/RSP and REG-REQ/RSP during reentry processing/ARQ transmission).

Further, the serving BS 320 sends information corresponding to the BCL to the target BS 340. In the first BCL (BCL 1), the serving BS 320 sends an original SBC (Basic Capability) profile to the target BS 340 (Step 317).

As a result, it is possible to omit the step of transmitting SBC_REQ/RSP from the network reentry process.

It should be noted that the same as the above description about the first-level backbone communication can also be applied to the second and third-level backbone communication which will be described below.

Figure 4A:
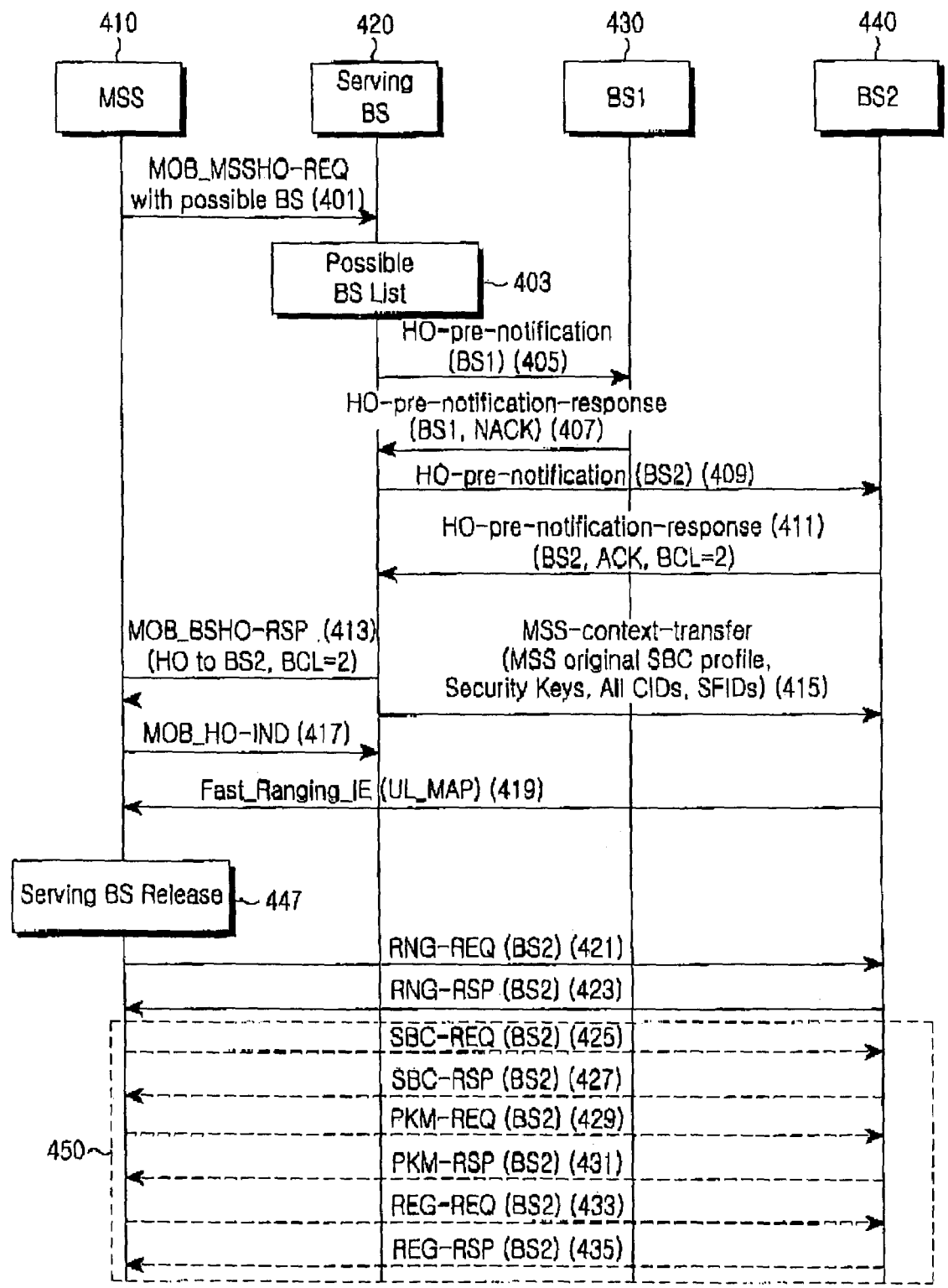
FIGS. 4A and 4B are flow diagrams illustrating a second-level backbone communication for handover optimization in a mobile broadband wireless access system according to a preferred embodiment of the present invention.
Figure 4B:
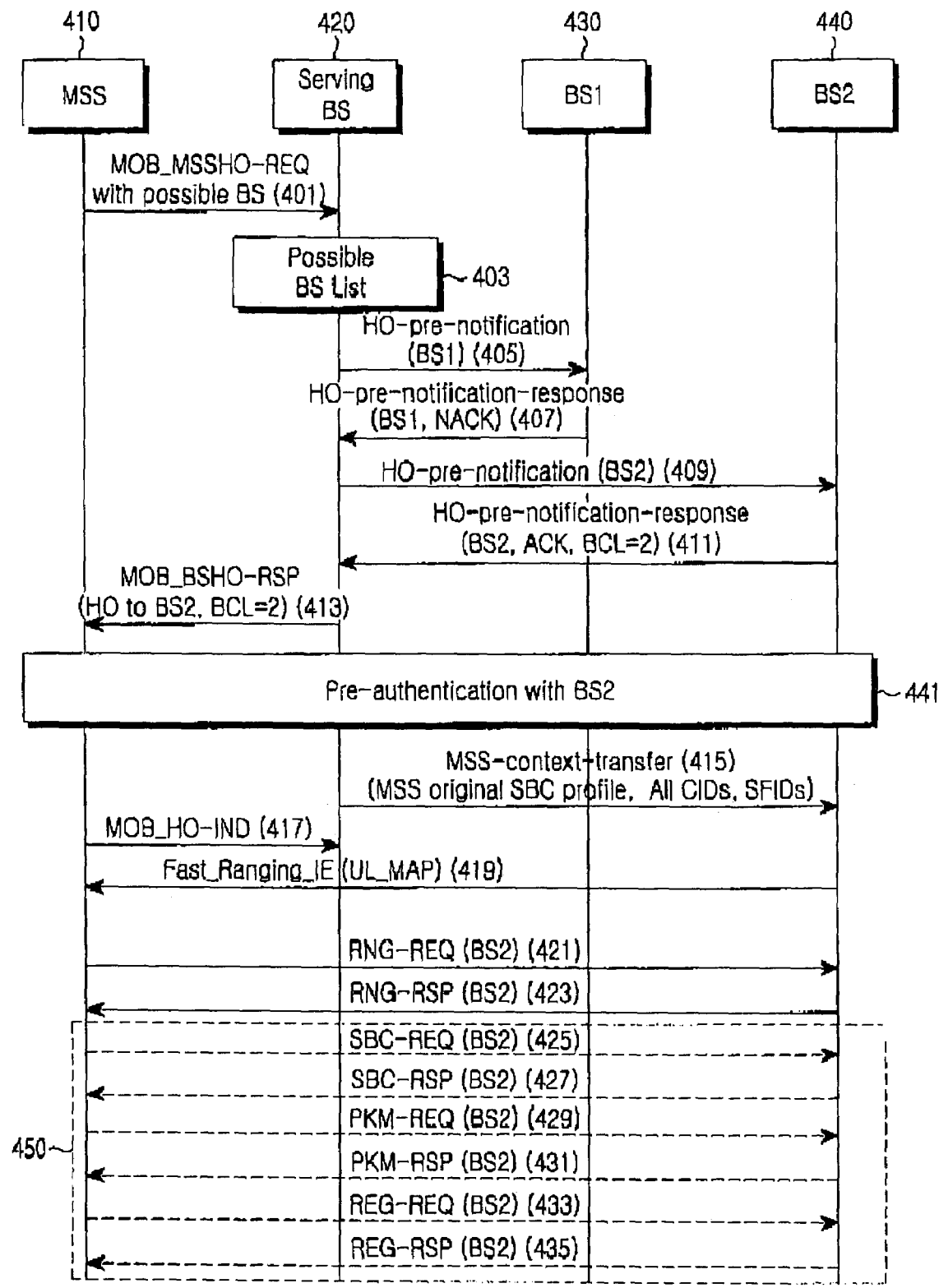

FIGS. 4A and 4B are flow diagrams illustrating a second-level backbone communication for handover optimization in a mobile broadband wireless access system according to a preferred embodiment of the present invention.

The second-level backbone communication according to the present invention can be classified into communications employing a security key reuse scheme as shown in FIG. 4A and communications employing a pre-authentication scheme as shown in FIG. 4B. According to the security key reuse scheme, all or some of the keys used for security in a previous serving BS are used without change for the new target BS. According to the pre-authentication scheme, the serving BS receives a key to be used by the target BS in advance from the target BS and transmits it to the MSS before starting the handover, that is, before sending the HO-IND, so that the MSS can wholly or partially omit the exchange of the PKM_REQ message and PKM_RSP message (shown in Step 450 of FIGS. 4A and 4B) when the MSS performs network reentry.

Referring to FIGS. 4A and 4B, for the sake of clarity steps shown in FIG. 3 correspond with respectively with steps shown in FIG. 4, and as such no further description will be given. In the course of negotiation through network backbone messages between the serving BS 420 and available target BSs 430 and 440, the available target BSs transmits an HO_pre_notification_response message after inserting a corresponding BCL (e.g. BCL=2) in the HO_pre_notification_response message (Steps 407 and 411). FIGS. 4A and 4B are based on an assumption that the target BS2 440 is an available target BS and the serviceable target BS2 440 transmits the HO_pre_notification_response message after inserting a corresponding BCL (e.g. BCL=2) in the HO_pre_notification_response message. Then, the serving BS 420 inserts the information of BCL (BCL=2) received from the target BS2 440 in the MOB_BSHO_RSP message and then transmits the message to the MSS 410 (Step 413). Here, the serving BS 420 sends information corresponding to the BCL to the target BS2 440 (Step 415). As a result, it is possible to omit all steps of the network reentry process except for the ranging step in the second level backbone communication. Namely, it is possible to omit SBC_REQ/RSP, PKM_REQ/RSP, REG_REQ/RSP message exchange between the MSS and the target BS.

Hereinafter, the corresponding information sent from the serving BS 420 to the target BS2 440 in the second-level backbone communication will be discussed.

As described above, the second-level backbone communication can be classified into a security key reuse type and a pre-authentication type. In the second-level backbone communication, the serving BS 420 sends not only the service profile of the MSS 410 but also all Connection Identifiers (CIDs), Service Flow CIDs (SFIDs), and security keys (in the case of employing the key reuse scheme) to the target BS2 440. As a result, in the second-level backbone communication, it is possible to omit the basic capability re-negotiation step (i.e., the step of transmitting/receiving the SBC_REQ message and the SBC_RSP message), the re-authorization step (i.e., the step of transmitting/receiving the PKM_REQ message and the PKM_RSP message), and the re-registration step (i.e., the step of transmitting/receiving the REG_REQ message and the REG _RSP message) from the network reentry process. In a Medium Access Control (MAC) layer, each of different QoS classes is identified by a CID. Here, such identification is achieved by using the SFID. Also, when the identified information is encrypted, a key is attached to the encrypted information. The reason why it is necessary to transmit all CIDs is that each connection in the air link is identified by a CID which is separately controlled by each BS. Therefore, the target BS must notify its currently used CID to the MSS, which can be defined by a TLV of the REG_RSP message. That is, it is possible to omit unnecessary transmission/reception steps by transmitting the information as described above to the target BS in the above-mentioned step. In other words, according to the second-level backbone communication process of the present invention, it is possible to omit step 450 in FIGS. 4A and 4B.

As described above, the second-level backbone communication illustrated in FIGS. 4A and 4B is proposed by the present invention in order to minimize the time delay required for handover. Further, not only the second-level backbone communication but also the third-level backbone communication (which will be described below) proposes two schemes according to the authentication type, which include the security key reuse scheme and the pre-authentication scheme. FIG. 4A illustrates a signaling process using the security-key-reuse scheme and FIG. 4B illustrates a signaling process using the pre-authentication scheme.

The second-level backbone communication process as described above may include all the steps of the first level backbone communication process. Moreover, in the second-level backbone communication process, the serving BS passes all CIDs including the basic CID, the primary CID, the secondary CID, the transport CID and the SFID to the target BS. Further, in the second-level backbone communication process, Hashed Message Authentication Code (HMAC), Tuple and REG_RSP TLV encoded information are carried by the transmitted RNG_RSP message (Step 423), so that it is possible to omit all the steps (i.e. step 450 in FIGS. 4A and 4B) of the network reentry process except for the ranging process. For the sake of clarity, in Step 450, Steps 425, 427, 429, 431, 433 and 435 correspond with Steps 329, 331, 333, 335, 337 and 339, respectively, and therefore no further description is given.

Figure 5A:
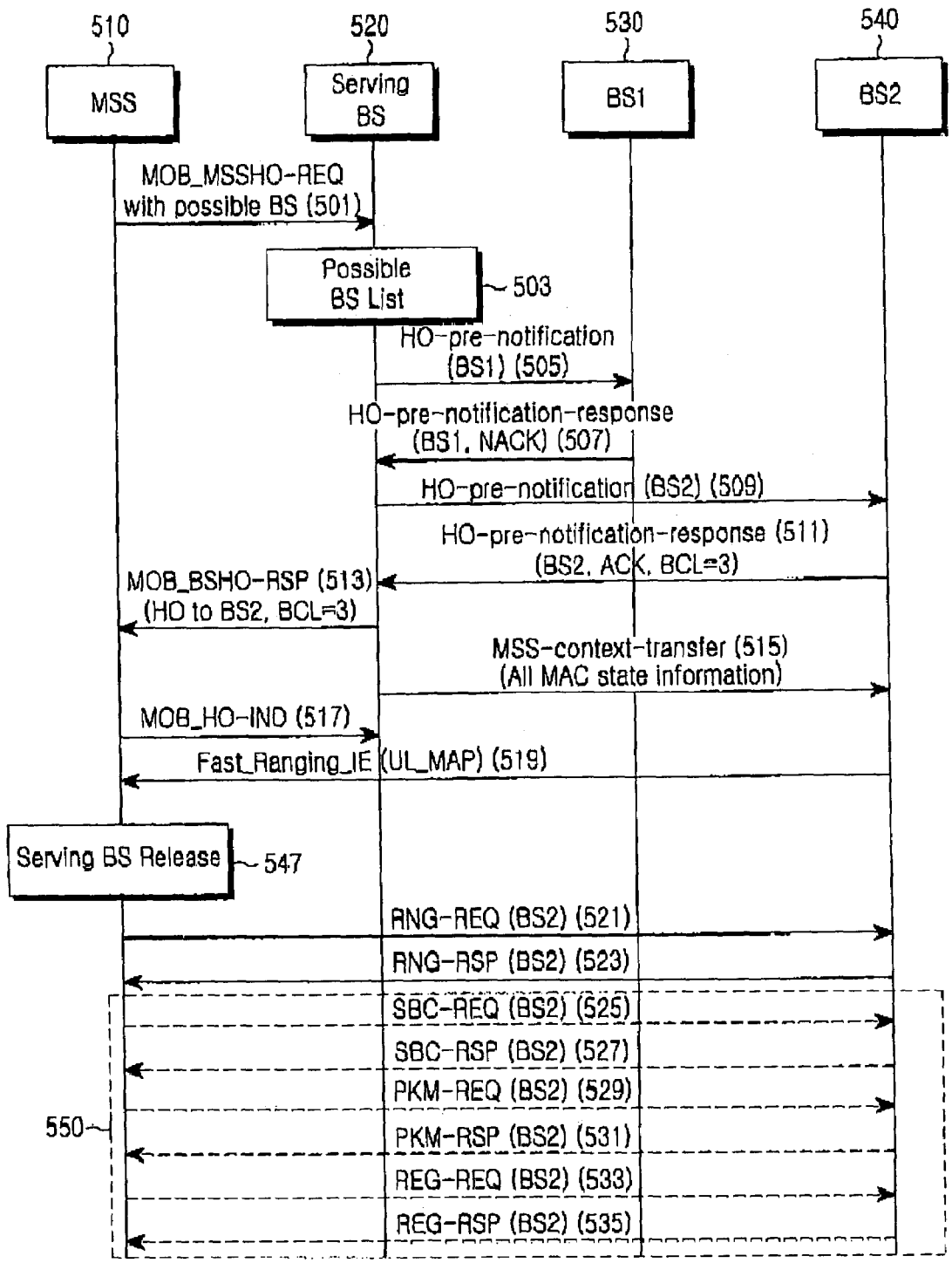
FIGS. 5A and 5B are flow diagrams illustrating a third-level backbone communication for handover optimization in a mobile broadband wireless access system according to a preferred embodiment of the present invention.
Figure 5B:
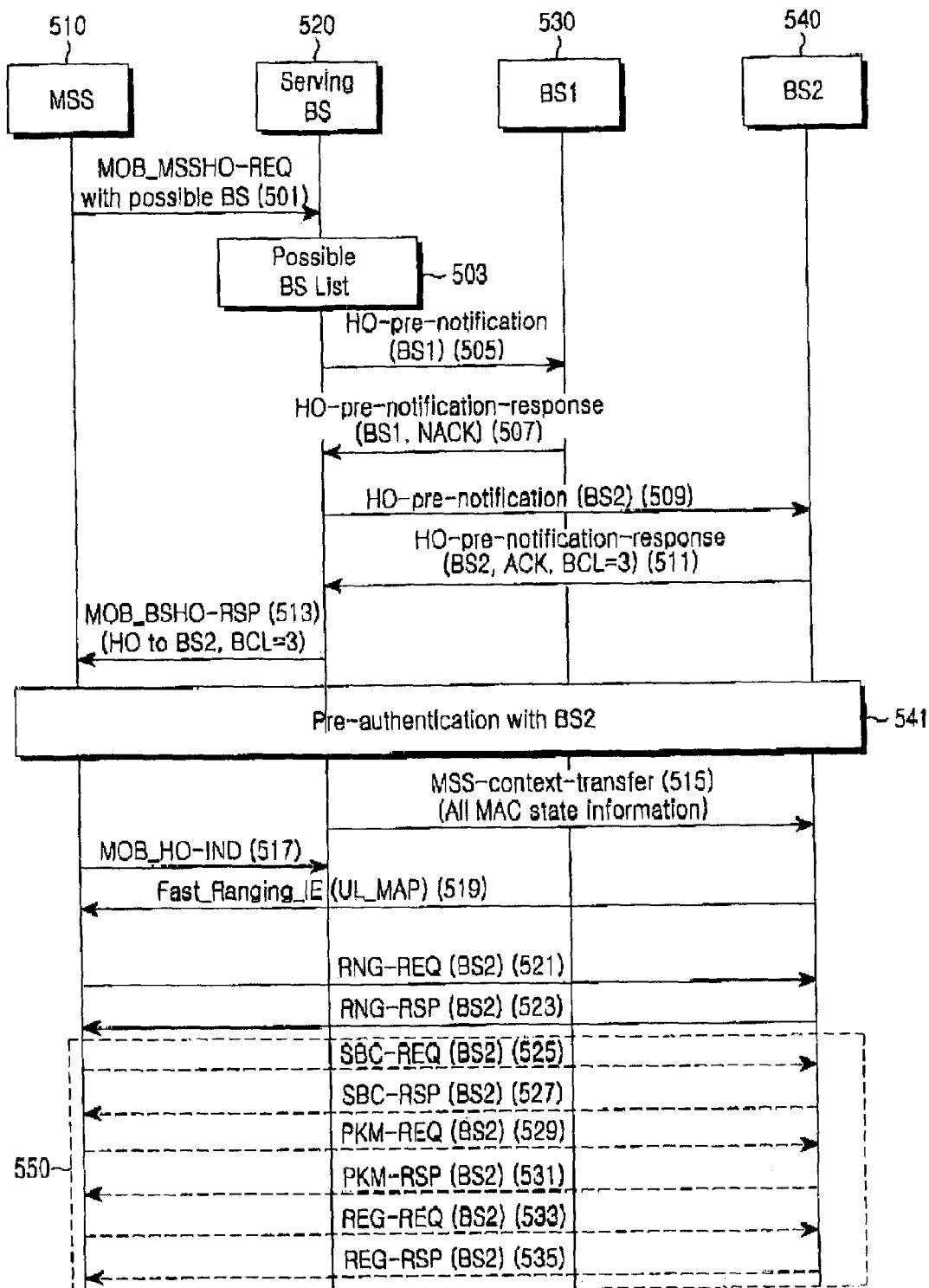

FIGS. 5A and 5B illustrate a third-level backbone communication for handover optimization in a mobile broadband wireless access system according to a preferred embodiment of the present invention.

Similar to the second-level backbone communication, the third-level backbone communication can be classified into two types. That is to say, the third level backbone communication can be classified into communication employing the security-key-reuse scheme as shown in FIG. 5A and communication employing the pre-authentication scheme as shown in FIG. 5B.

Referring to FIGS. 5A and 5B, in the course of negotiation through network backbone messages between the serving BS 520 and available target BSs 530 and 540, the available target BSs transmits an HO_pre_notification_response message after inserting a corresponding BCL (e.g. BCL=3) in the HO_pre_notification_response message (Steps 507 and 511). FIGS. 5A and 5B are based on an assumption that the target BS2 540 is an available target BS and the serviceable target BS2 540 transmits the HO_pre_notification_response message after inserting the corresponding BCL (e.g. BCL=3) in the HO_pre_notification_response message (Step 511). Then, the serving BS 520 inserts the information of BCL (BCL=3) received from the target BS2 540 in the MOB_B-SHO_RSP message and then transmits the MOB_B-SHO_RSP message to the MSS 510 (Step 513). Here, the serving BS 520 sends information corresponding to the BCL to the target BS2 540 (Step 515). As a result, it is possible to omit all steps of the network reentry process except for the ranging process in the third-level backbone communication. For the sake of clarity, steps with the same names in FIGS. 5A and 5B correspond to each other.

Hereinafter, the corresponding information sent from the serving BS 520 to the target BS2 540 in the third-level backbone communication will be discussed.

As described above, the third-level backbone communication can be classified into two types, that is, the security-key-reuse type as shown in FIG. 5A and the pre-authentication type as shown in FIG. 5B. In the third-level backbone communication, the serving BS 520 passes all Medium Access Control (MAC) state information of the MSS 510 to the target BS2 540. As a result, in the third level backbone communication, it is possible to omit all the steps of the network reentry process except for the ranging process (i.e. the steps of transmitting/receiving the RNG_REQ message (Step 521) and the RNG_RSP message (523)). In other words, according to the third level backbone communication process proposed by the present invention, it is possible to omit step 550 in FIGS. 5A and 5B. Further, the serving BS passes the ARQ state information to the target BS, so that the ARQ can be reused without being reset. The ARQ refers to information indicating the level to which the MSS has received information. Therefore, when the information has not been normally transmitted, the packet transmission must be restarted from the failure in receiving the ACK. As a result, unnecessary waste of resource can be avoided by reporting the level to which the MAC ARQ has been transmitted.

As described above, the third-level backbone communication illustrated in FIGS. 5A and 5B is proposed by the present invention in order to minimize the time delay for handover. Further, the third level backbone communication process includes all the steps and uses all the messages of the second level backbone communication processes. In addition to the messages of the second level backbone communication processes, the automatic repeat request (ARQ) state information is passed from the serving BS to the target BS in the third level backbone communication. Therefore, the target BS can reduce the time delay for handover by using the ARQ state information from the serving BS as it is without resetting the ARQ state information.

Hereinafter, the BS handover response (MOB_B-SHO_RSP) message (as shown in Step 513) newly proposed by the present invention as described above will be described in detail with reference to Table 1. The present invention can be applied to not only the handover requested by the MSS as described above but also handover requested by the serving BS. In the latter case, that is, in the handover requested by the serving BS, the BCL information as described above may be inserted in the MOB_BSHO_REQ message in order to perform the stepped backbone communication. The MOB_B-SHO_REQ message will be described later in detail with reference to Table 2.

First, the MOB_BSHO_RSP message includes information about the target BS to which the MSS will be handovered and has a structure as shown in Table 1.

TABLE 1

| Syntax | Size | |
|---|---|---|
| MOB_BSHO-RSP_Message_Format ( ) { | | |
| Management Message Type = 54 | 8 bits | |
| Estimated HO Start | 8 bits | |
| For (i =0; i <N_Recommended; i++) { | | Neighbor base stations shall be presented in an order such that the first presented is the one most recommended and the last presented is the least recommended. N_Recommended can be derived from the known length of the message |
| Neighbor BS ID | 48 bits | |
| service level prediction | 8 bits | |
| Backbone Communication Level } | 8 bits | |
| HMAC Tuple } | 21 bytes | |

As shown in Table 1, the MOB_HSHO_RSP message includes a plurality of information elements (IEs) such as Management Message Type indicating the type of the transmitted message, Estimated HO Start indicating the time point at which it is expected to start the handover process, and N_Recommended indicating the target BSs selected by the serving BS. Here, the N_Recommended includes an identifier (Neighbor BS ID) of each of the selected target BSs and a service level (service level prediction) at which each of the target BSs is expected to provide service to the MSS. Further, the IEs shown in Table 1 include Backbone Communication Level for handover optimization. Here, the Backbone Communication Level includes the first backbone communication level (BCL=1), the second backbone communication level (BCL=2) and the third backbone communication level (BCL=3).

The above description discusses a handover process according to a request by the MSS in a mobile broadband wireless access system. However, the present invention is not limited to the above-discussed handover process and can be applied to handover according to a request by the BS without question. In the case of the handover according to a request by the BS, the BCL information is inserted in and carried by the MOB_BSHO_REQ message transmitted to the MSS. The MOB_BSHO_REQ message has a structure as shown in Table 2 below.

TABLE 2

| Syntax | Size | |
|---|---|---|
| MOB_BSHO-REQ_Message_Format ( ) { | | |
| Management Message Type = 52 | 8 bits | |
| Network Associated HO supported | 1 bit | |
| For (i =0; i <N_Recommended; i++) { | | N_Recommended can be derived from the known length of the message |
| Neighbor BS ID | 48 bits | |
| service level prediction | | |
| Backbone Communication Level | 8 bits | |
| } | | |
| reserved | 7 bits | |
| HMAC Tuple | 21 bytes | |
| } | | |

As shown in Table 2, the MOB_HSHO_REQ message includes a plurality of Information Elements (IEs) such as Management Message Type indicating the type of the transmitted message and N_Recommended indicating the scanned result by the serving BS. The N_Recommended includes an identifier of each of the target BSs, a Carrier to Interference and Noise Ratio (CINR) of a pilot signal of each of the target BSs, and a service level at which each of the target BSs is expected to provide service to the MSS. Further, the IEs in Table 2 include Backbone Communication Level for handover optimization. As described above, the Backbone Communication Level includes the Semi Nomadic (BCL=0), the first backbone communication level (BCL=1), the second backbone communication level (BCL=2) and the third backbone communication level (BCL=3).

As described above, the MOB_BSHO_REQ message is transmitted while carrying the BCL information in the case of handover based on the request of the BS according to another embodiment of the present invention. That is, in a state where the information for the stepped backbone communication is set in advance through the backbone communication between the serving BS and the target BS, the serving BS transmits the MOB_BSHO_REQ message including the BCL information to the MSS. Then, the MSS transmits the MOB_HO_IND message and then directly proceeds to the next step while omitting unnecessary steps.

Hereinafter, a method of handover employing a polling mechanism according to another embodiment of the present invention will be described. The present invention proposes a polling mechanism as well as the stepped backbone communication, in order to optimize the network reentry process.

According to the polling mechanism proposed by the present invention, in order for a BS to allocate a bandwidth to an MSS in a mobile broadband wireless access system, four steps of message exchange between the BS and the MSS is necessary. That is, the message exchange process includes a first step for bandwidth request ranging, a second step in which the BS allocates uplink burst for the bandwidth request header to the MSS, a third step in which the MSS transmits the bandwidth request header to the BS, and a fourth step in which the BS allocates burst for packet transmission to the MSS.

Here, in order to reduce the time delay during handover, the present invention proposes a mechanism i.e., a "polling mechanism") in which an uplink burst is allocated to the MSS at every frame after the transmission of the MOB_MSS-HO_REQ.

In other words, according to the polling mechanism proposed by the present invention, the BS must exchange messages with the MSS in four steps in total as described above in order to allocate a bandwidth to the MSS. For such a process, the present invention proposes a mechanism in which a small burst by which a bandwidth request header can be transmitted is allocated every frame until the serving BS receives the MOB_HO_IND message after transmitting the MOB_B-SHO_REQ message or receiving the MOB_MSSHO_REQ message from the MSS.

Further, the polling mechanism can be applied not only to the serving BS but also to the target BS. Specifically, when the target BS receives the ranging request (RNG_REQ) message from the MSS, the target BS allocates a small burst capable of carrying a bandwidth request header to the MSS in every frame as described above.

As described above, the present invention proposes a new stepped backbone communication in order to reduce the network reentry process for each handover and a polling mechanism in order to time delay for handover, thereby providing a system and method capable of optimizing handover capability in a mobile broadband wireless access system.

The present invention provides an optimal handover system and scheme for minimizing time delay of handover in a mobile communication system. Especially, the present invention can improve the existing handover capacity by using the stepped backbone communication scheme and the polling mechanism in a mobile communication system.

Further, according to the present invention, the serving BS and the target BS preliminarily exchange information corresponding to each level, including basic capability information, security key, ARQ state information, etc., so that it is possible to omit the network reentry process except for the ranging process, thereby reducing the duration during which data transmission/reception due to handover.

Moreover, according to the present invention, the network reentry process at every handover can be reduced by using a stepped backbone communication and the handover time delay can be reduced by using the polling mechanism in a mobile broadband wireless access system, so that the handover performance in a mobile broadband wireless access system can be optimized.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for performing a handover by a mobile subscriber station in a mobile communication system the method comprising:

transmitting a handover request message to a serving base station; and receiving a handover response message in response to the handover request message from the serving base station, wherein the handover response message includes an identifier of a recommended neighbor base station and an indication field indicating whether at least one management message is required or omitted during a network reentry process with the mobile subscriber station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover response message includes a service level prediction field indicating a level of service the mobile subscriber station can expect from the recommended neighbor base station.

2. A method for performing a handover by a mobile subscriber station in a mobile communication system, the method comprising:

receiving a handover request message from a serving base station, wherein the handover request message includes an identifier of a recommended neighbor base station and an indication field indicating whether at least one management message is required or omitted during a network reentry process with the mobile subscriber station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover request message includes a service level prediction field indicating a level of service the mobile subscriber station can expect from the recommended neighbor base station.

3. A system for performing a handover in a mobile communication system, the system comprising:

a serving base station; and a mobile subscriber station for transmitting a handover request message to the serving base station, and receiving a handover response message in response to the handover request message from the serving base station, wherein the handover response message includes an identifier of a recommended neighbor base station and an indication field indicating whether at least one management message is required or omitted during a network reentry process with the mobile subscriber station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover response message includes a service level predication field indicating a level of service the mobile subscriber station can expect from the recommended neighbor base station.

4. A system for supporting a handover in a mobile communication system, the system comprising:

a mobile subscriber station; and a serving base station for receiving a handover request message from the mobile subscriber station, and transmitting a handover response message in response to the handover request message to the mobile subscriber station, wherein the handover response message includes an identifier of a recommended neighbor base station and an indication field indicating whether at least one management message is required or omitted during a network reentry process with the mobile subscriber station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover response message includes a service level prediction field indicating a level of service the mobile subscriber station can expect from the recommended neighbor base station.

5. A method for supporting a handover by a serving base station in a mobile communication system, the method comprising:

receiving a handover request message from a mobile subscriber station; and transmitting a handover response message in response to the handover request message to the mobile subscriber station, wherein the handover response message includes an identifier of a recommended neighbor base station and an indication field indicating whether at least one management message is required or omitted during a network reentry process with the mobile station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover response message includes a service level prediction field indicating a level of service the mobile subscriber station can expect from the recommended neighbor base station.

6. A method for supporting a handover by a serving base station in a mobile communication system, the method comprising:

transmitting a handover request message to a mobile subscriber station, wherein the handover request message includes an identifier of a recommended neighbor base station and an indication field indicating whether at least one management message is required or omitted during a network reentry process with the mobile subscriber station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover request message includes a service level prediction field indicating a level of service the mobile subscriber station can expect from the recommended neighbor base station.

7. A system for performing a handover in a mobile communication system, the system comprising:

a serving base station; and a mobile subscriber station for receiving a handover request message from the serving base station, wherein the handover request message includes an identifier of a recommended neighbor base station and an indication field indicating whether at least one management message is required or omitted during a network reentry process wit the mobile subscriber station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover request message includes a service level prediction field indicating a level of service the mobile subscriber station can expect from the recommended neighbor base station.

8. A system for supporting a handover in a mobile communication system, the system comprising:

a mobile subscriber station; and a serving base station for transmitting a handover request message to the mobile subscriber station, wherein the handover request message includes an identifier of a recommended neighbor base station and an indication field indicating whether at least one management message is required or omitted during a network reentry process with the mobile subscriber station and the recommended neighbor base station, and wherein the at least one management message includes at least one of a subscriber station basic capability request (SBC-REQ) message, a subscriber station basic capability response (SBC-RSP) message, a registration request (REG-REQ) message and a registration response (REG-RSP) message, and at least one of a privacy key management request (PKM-REQ) message and a privacy key management response (PKM-RSP) message during an exchange of the PKM-REQ message and the PKM-RSP message, and wherein the handover request message includes a service level prediction field indicating a level of service the mobile subscriber station can expect from the recommended neighbor base station.

* * * * *